United States Patent
Watanabe et al.

[11] Patent Number: 6,111,626
[45] Date of Patent: *Aug. 29, 2000

[54] LIQUID CRYSTAL DISPLAY WITH MEANS FOR VARYING INTENSITY OF APPLIED ELECTRIC FIELD

[75] Inventors: Makoto Watanabe; Takahiko Watanabe, both of Tokyo, Japan

[73] Assignee: NEC Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/168,693

[22] Filed: Oct. 9, 1998

[30] Foreign Application Priority Data

Oct. 9, 1997 [JP] Japan ..................... 9-277562

[51] Int. Cl.[7] ................ G02F 1/1343; G02F 1/1333; G02F 1/1347
[52] U.S. Cl. ................... 349/141; 349/138; 349/85; 349/78
[58] Field of Search ................... 349/141, 78, 85, 349/138, 139, 191

[56] References Cited

FOREIGN PATENT DOCUMENTS 63-21907   5/1988   Japan .
9-105908   4/1997   Japan .

*Primary Examiner*—William L. Sikes
*Assistant Examiner*—Toan Ton
*Attorney, Agent, or Firm*—Sughrue, Mion, Zinn, Macpeak & Seas, PLLC

[57] ABSTRACT

A parallel field active matrix liquid crystal display comprising a means for varying the intensity of an applied electric field. The intensity of the applied electric field is varied by insulating film slits or electric field shield pixel electrodes. Insulating film slits are defined by removing an insulating film between electrode pairs, in any one or more of a plurality of pairs of electrodes including pixel electrodes and common electrodes within a unit pixel of a display pixel. Alternatively, electric field shield pixel electrodes for shielding part of an electric field are patterned in the same layer as pixel electrodes above several common electrodes of a plurality of pairs of electrodes including pixel electrodes and common electrodes within a unit pixel of a display pixel.

20 Claims, 22 Drawing Sheets

*x-y PLANE IS A DISPLAY PLANE

FIG. 8
PRIOR ART

| | | |
|---|---|---|
| MAJOR AXIS VIEW | $\Delta n' \dfrac{n_e n_o}{\sqrt{n_e^2 \sin^2 \theta + n_o^2 \cos^2 \theta}} - n_o$ | $d' \dfrac{d}{\cos \theta}$ |
| MINOR AXIS VIEW | $\Delta n$ | $\dfrac{d}{\cos \theta}$ |

$n_e$ : REFRACTIVE INDEX OF LIQUID CRYSTAL ALONG MAJOR AXIS $n_o$ : REFRACTIVE INDEX OF LIQUID CRYSTAL ALONG MINOR AXIS $d$ : CELL THICKNESS

——— POTENTIAL GRADIENT WHEN DIELECTRIC CONSTANT OF INTER-MEDIA BETWEEN ELECTRODES AND LIQUID CRYSTAL IS LARGE

---------- POTENTIAL GRADIENT WHEN DIELECTRIC CONSTANT OF INTER-MEDIA BETWEEN ELECTRODES AND LIQUID CRYSTAL IS SMALL

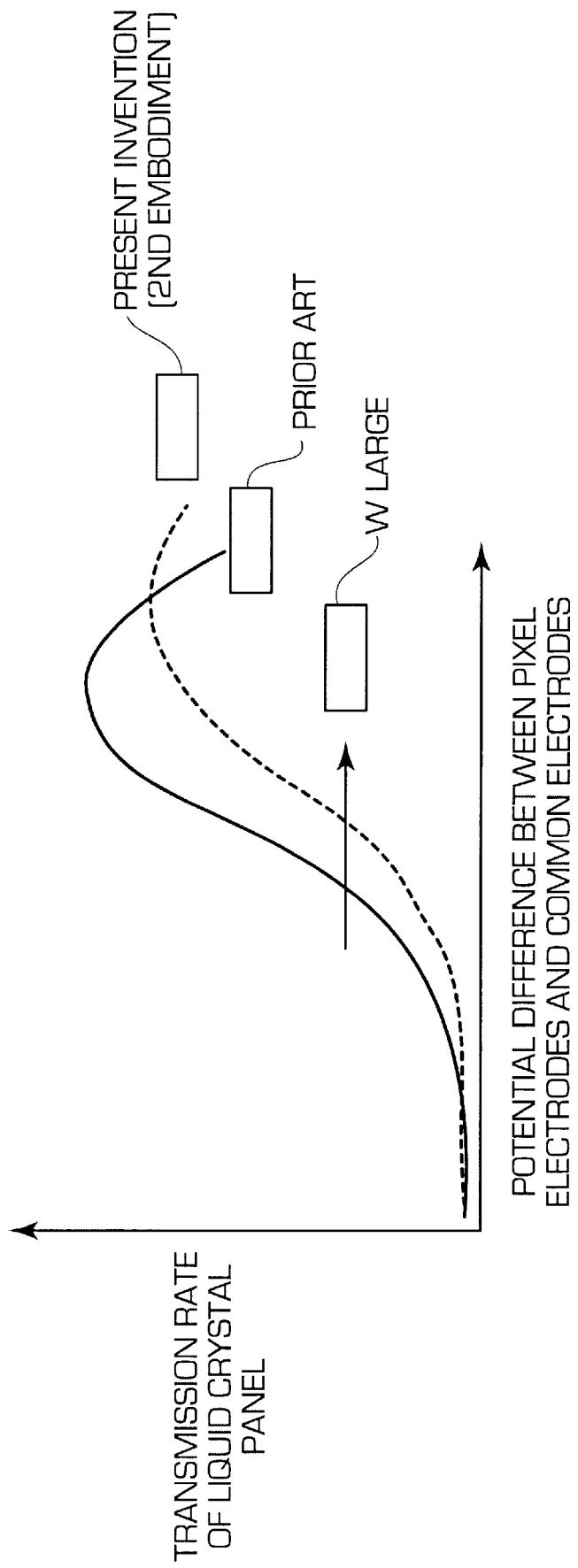

LIQUID CRYSTAL DISPLAY WITH MEANS FOR VARYING INTENSITY OF APPLIED ELECTRIC FIELD

BACKGROUND OF THE INVENTION

1. Field of the Invention

The present invention relates to a liquid crystal display device, and more particularly to an active-matrix liquid crystal display device and a method of displaying an image on such an active-matrix liquid crystal display device.

2. Description of the Related Art

One process of applying an electric field to the liquid crystal of a liquid crystal display device is a static driving process by which a constant voltage signal is steadily applied to each electrode. If a large amount of information is to be displayed on a liquid crystal display device according to the static driving method, then a very large number of signal lines would be required. For displaying such a large amount of information on a liquid crystal display device, a multiplex driving method is usually employed for supplying a multiplexed signal voltage to electrodes. In several versions of the multiplex driving method, active matrix method holds electric charges applied to electrodes until a next frame is supplied, so that high-quality images can be displayed.

The electric field may be applied to the liquid crystal either perpendicularly to glass substrates which sandwich the liquid crystal or parallel to the glass substrates (In-Plane Switching, or IPS, method). The latter method lends itself to being applied to large-size display monitors because it allows a wide angle of view. FIG. 1 of the accompanying drawings shows a conventional electrode structure of a unit pixel of a display pixel according to the IPS method, as disclosed in Japanese patent publication No. 63-21907. The present invention is concerned with an active-matrix liquid crystal display device in which an electric field is applied to the liquid crystal parallel to the glass substrates according to the IPS method.

The conventional electrode structure will be described below.

FIG. 1 shows in plan the conventional electrode structure, and FIG. 2 of the accompanying drawings is a cross-sectional view taken along line II—II of FIG. 1. As shown in FIG. 2, a glass substrate 101 of a thin-film transistor (TFT) as an active device supports common electrodes 103 and an interlayer insulating film 105 thereon, and pixel electrodes 104 and signal lines 102 disposed on the interlayer insulating film 105. The pixel electrodes 104 and the common electrodes 103 are positioned alternately with each other. The pixel electrodes 104 and the signal lines 102 are covered with a protective insulating film 106 which is coated with a TFT alignment film 107 that is rubbed in a direction to orient liquid crystal molecules. The glass substrate 101, the common electrodes 103, the interlayer insulating film 105, the pixel electrodes 104, the signal lines 102, the protective insulating film 106, and the TFT orientation film 107 jointly make up a TFT substrate assembly 100.

A matrix-shaped light shield film 203 is disposed on an opposed glass substrate 201, and a color layer 204 for displaying colors is disposed on the light shield film 203. A planarizing film 202 for providing a flat surface on the opposed glass substrate 201 is disposed on the light shield film 203 and the color layer 204. The planarizing film 202 is coated with an opposed-substrate orientation film 207 that is rubbed in a direction opposite to the direction in which the TFT alignment film 107 is rubbed. The opposed glass substrate 201, the light shield film 203, the color layer 204, the planarizing film 202, and the opposed-substrate alignment film 207 jointly make up an opposed substrate assembly 200.

A liquid crystal material 301 is sealed between the TFT substrate assembly 100 and the opposed substrate assembly 200. A TFT polarizer 110 whose axis of transmission lies perpendicularly to the rubbed direction is attached to a surface of the glass substrate 101 remote from the common electrodes 103. An opposed-substrate polarizer 205 whose axis of transmission lies perpendicularly to the axis of transmission of the TFT polarizer 110 is attached to a surface of the opposed glass substrate 201 remote from the light shield film 203 and the color layer 204.

The TFT substrate assembly 100, the opposed substrate assembly 200, the liquid crystal material 301, the TFT polarizer 110, and the opposed-substrate polarizer 205 jointly make up a liquid crystal display panel 300.

Operation of the liquid crystal display panel 300 will be described below.

FIG. 3 of the accompanying drawings shows a rectangular area of FIG. 2 at an enlarged scale, the view being illustrative of the manner in which the liquid crystal display panel 300 operates. In FIG. 1, a TFT 109 is switched on and off by an on/off signal from a scanning line 108 that is disposed in the same layer as the common electrodes 103. When the TFT 109 is turned on, charges from the signal lines 102 flow into the pixel electrodes 104. After the TFT 109 is turned off, the pixel electrodes 104 hold the charges and are kept at a certain potential. A constant DC voltage is applied at all times to the common electrodes 103. Due to a potential difference between the pixel electrodes 104 and the common electrodes 103, a horizontal inter-electrode electric field is developed parallel to the glass substrates. As shown in FIG. 3, liquid crystal molecules 302 are rotated, causing a change in light retardation to change the amount of light transmitted through regions where the light shield film 203, the pixel electrodes 104, the common electrodes 103, the scanning lines 108, and the TFT 109 are not present. The liquid crystal molecules 302 are rotated in the illustrated direction when the dielectric constant anisotropy of the liquid crystal material is positive and in the direction opposite to the illustrated direction when the dielectric constant anisotropy of the liquid crystal material is negative.

FIG. 4 of the accompanying drawings illustrates the basic principles of the IPS method. The IPS method will be described with respect to a liquid crystal material whose dielectric constant anisotropy is positive. The liquid crystal molecules 302 are initially oriented perpendicularly to the axis of transmission of the TFT polarizer 110. Since incident light applied to the liquid crystal display panel 300, which has been polarized by the TFT polarizer 110, is not retarded by the liquid crystal material 301, the incident light is blocked almost completely by the opposed-substrate polarizer 205. At this time, the liquid crystal display device displays a black image.

When a horizontal electric field generated between the pixel electrodes 104 and the common electrodes 103 is applied to the liquid crystal molecules 302, the liquid crystal molecules 302 are rotated. Then, incident light applied to the liquid crystal display panel 300 is retarded due to the refractive index anisotropy of the liquid crystal molecules 302, and generally becomes elliptically polarized immediately before it passes through the opposed-substrate polarizer 205. The component of the elliptically polarized light which lies parallel to the axis of transmission of the opposed-substrate polarizer 205 is emitted from the liquid crystal display panel 300. The time average of the intensity of the emitted light is visually perceived by the observer of the liquid crystal display panel 300. The pattern of the elliptically polarized light varies depending on the angle ψ formed between the average direction in which the liquid crystal molecules 302 are directed and the direction in which the liquid crystal molecules 302 are initially oriented. A standardized transmittance $T/T_0$ of the liquid crystal display panel 300 at this time may be approximated by the following equation (1):

$$T/T_0 = \sin^2(2\psi) \sin^2(\Delta n \cdot d\pi/\lambda) \tag{1}$$

where ψ is the angle formed between the average direction in which the liquid crystal molecules 302 are directed and the direction in which the liquid crystal molecules 302 are initially oriented, Δn the refractive index anisotropy of the liquid crystal molecules 302, d the cell gap, and λ the wavelength of the transmitted light.

As can be seen from the equation (1), the transmittance is minimum when ψ=0° and maximum when ψ=45°.

The above liquid crystal display device suffers the following problems:

When an image displayed by the liquid crystal display device is viewed at a relatively large viewing angle θ (see FIG. 7 of the accompanying drawings), the displayed image becomes bluish or yellowish (color tint) due to the refractive index anisotropy of the liquid crystal molecules. As shown in FIG. 5 of the accompanying drawings, the displayed image is tinted bluish when it is viewed along the major axis of the liquid crystal molecule 302, and tinted yellowish when it is viewed along the minor axis of the liquid crystal molecule 302. FIG. 6 of the accompanying drawings shows x-y chromaticity changes caused when a medium-tone image displayed on the liquid crystal display device is viewed at the viewing angle θ=60° and an azimuth angle φ=0°–360°. The viewing angle θ and the azimuth angle φ are defined shown in FIG. 7. The arrows represent chromaticity coordinates at the time the liquid crystal display device is viewed head-on. It will be understood that the displayed color is greatly shifted toward a bluish tint or a yellowish tint when viewed in an oblique field of view. The mechanism of the above phenomenon will be described below.

FIG. 8 of the accompanying drawings shows theoretical formulas for an effective refractive index anisotropy Δn' and an effective cell thickness d' when a liquid crystal molecule is viewed at a viewing angle θ along the major and minor axes of the liquid crystal molecule.

FIG. 9 of the accompanying drawings shows the dependency on the viewing angle θ of the effective light retardation (Δn'·d') when the liquid crystal molecule is viewed along the major and minor axes of the liquid crystal molecule, according to the theoretical formulas with typical characteristic values substituted in the parameters.

According to the equation (1), the relationship between a certain retardation $\Delta n_0 \cdot d_0$ and the maximum wavelength $\lambda_0$ of the light transmitted with the retardation is given by the following equation (2):

$$\Delta n_0 \cdot d_0 / \lambda_0 = \frac{1}{2} \tag{2}$$

Thus, the retardation and the maximum wavelength of the transmitted light are proportional to each other.

From FIG. 9 and the equation (2), it can be understood that the displayed image becomes bluish when viewed along the major axis of the liquid crystal molecule 302 and yellowish when viewed along the minor axis of the liquid crystal molecule 302, as shown in FIG. 5.

FIG. 10 of the accompanying drawings schematically shows orientations of liquid crystal molecules across the cell when (a) a black image, (b) a half-tone image, and (c) a white image are displayed. Because of constraining forces from the substrate surfaces, the liquid crystal molecules are directed more uniformly as the color of the displayed image changes toward black. The color tint is greater as the color changes toward black where the liquid crystal molecules are aligned. However, since the color tint does not manifest itself unless there is a certain amount of lightness in the displayed image, the color tint is most conspicuous in the middle-tone image.

One arrangement for improving the color tint is disclosed in Japanese laid-open patent publication No. 9-105908. According to the disclosed arrangement, common and pixel electrodes are disposed obliquely to each other for rotating liquid crystal molecules bidirectionally. While the disclosed proposal is highly effective to reduce the color tint, the aperture ratio is lowered because the common and pixel electrodes are disposed obliquely to each other. Furthermore, in a boundary region where the liquid crystal molecules rotate bidirectionally, a disclination due to a reverse twist of the liquid crystal material occurs and is visually recognized as an after image.

SUMMARY OF THE INVENTION

It is therefore an object of the present invention to provide an active-matrix liquid crystal display device which is capable of reducing a color tint at strict angles of view, and a method of displaying an image on such an active-matrix liquid crystal display device.

According to the present invention, an active-matrix liquid crystal display device includes a plurality of display pixels, scanning lines, and signal lines disposed on a first transparent substrate, a liquid crystal orientation film disposed on the first transparent substrate either directly or through an insulating layer, a liquid crystal orientation film disposed on a second transparent substrate disposed in opposed relation to the first transparent substrate, a liquid crystal layer sandwiched between the first transparent substrate and the second transparent substrate, means for varying a polarized state of incident light applied to the first transparent substrate based on an oriented state of the liquid crystal layer, the display pixel comprising pixel electrodes, common electrodes, and an active element for applying an electric field to the liquid crystal layer substantially parallel to the first transparent substrate and the second transparent substrate, the display pixel being connected to external control means for controlling the applied electric field freely according to a display pattern, the arrangement being such that a distance between pairs of the pixel electrodes and the common electrodes, a width of the pixel electrodes, and a width of the common electrodes are constant, and means for varying the intensity of the applied electric field controlled by the external control means.

The means for varying the intensity of the applied electric field may comprise a field shield pixel electrode disposed above at least one of the common electrodes in the display pixel with an insulating layer interposed therebetween, for shielding part of an electric field generated by the common electrode, the field shield pixel electrode having a shape overlapping part of the common electrode.

The means for varying the intensity of the applied electric field may comprise media disposed between the common electrodes and the pixel electrodes in the display pixel which are not identical but at least two kinds, of pairs of the pixel electrodes and the common electrodes.

According to the present invention, a method of displaying an image on the above active-matrix liquid crystal display device comprises the step of varying the intensity of the applied electric field with the means for varying the intensity of the applied electric field.

With the above means for varying the intensity of the applied electric field, it is possible to reduce a color tint at strict angles of view without producing an after image, while maintaining the aperture ratio of a liquid crystal display device according to the IPS process.

The above and other objects, features, and advantages of the present invention will become apparent from the following description with reference to the accompanying drawings which illustrate examples of the present invention.

BRIEF DESCRIPTION OF THE DRAWINGS

FIG. 8 is a table of theoretical formulas for an effective refractive index anisotropy Δn' and an effective cell thickness d' when a liquid crystal molecule is viewed at a viewing angle θ along the major and minor axes of the liquid crystal molecule;

FIG. 23 is a diagram showing the voltage vs. luminance characteristic of the liquid crystal display device according to the second embodiment of the present invention.

DETAILED DESCRIPTION OF THE PREFERRED EMBODIMENTS

Figure 1:
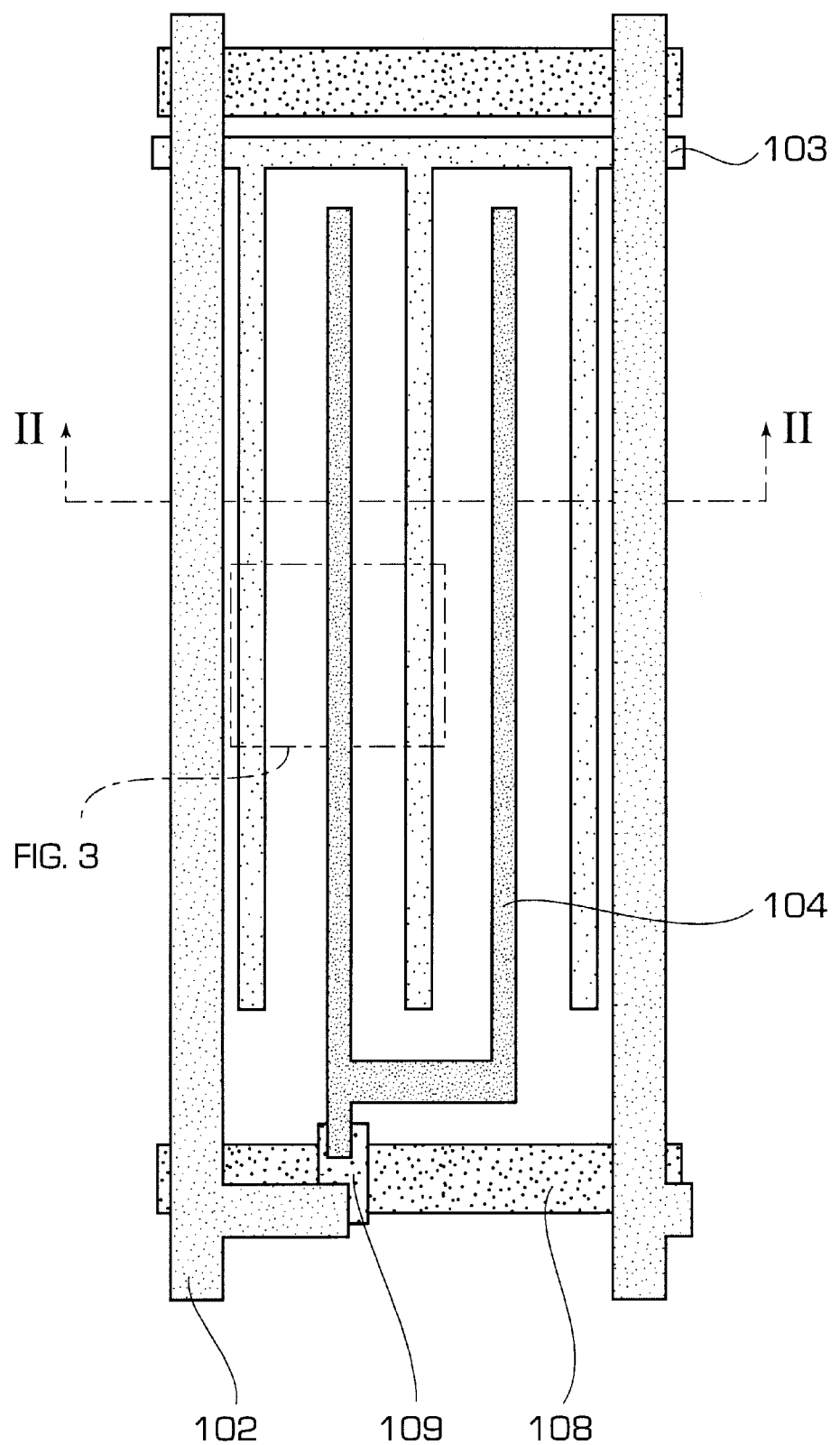
FIG. 1 is a plan view of an electrode structure of a unit pixel of a display pixel of a conventional liquid crystal display device.
Figure 2:
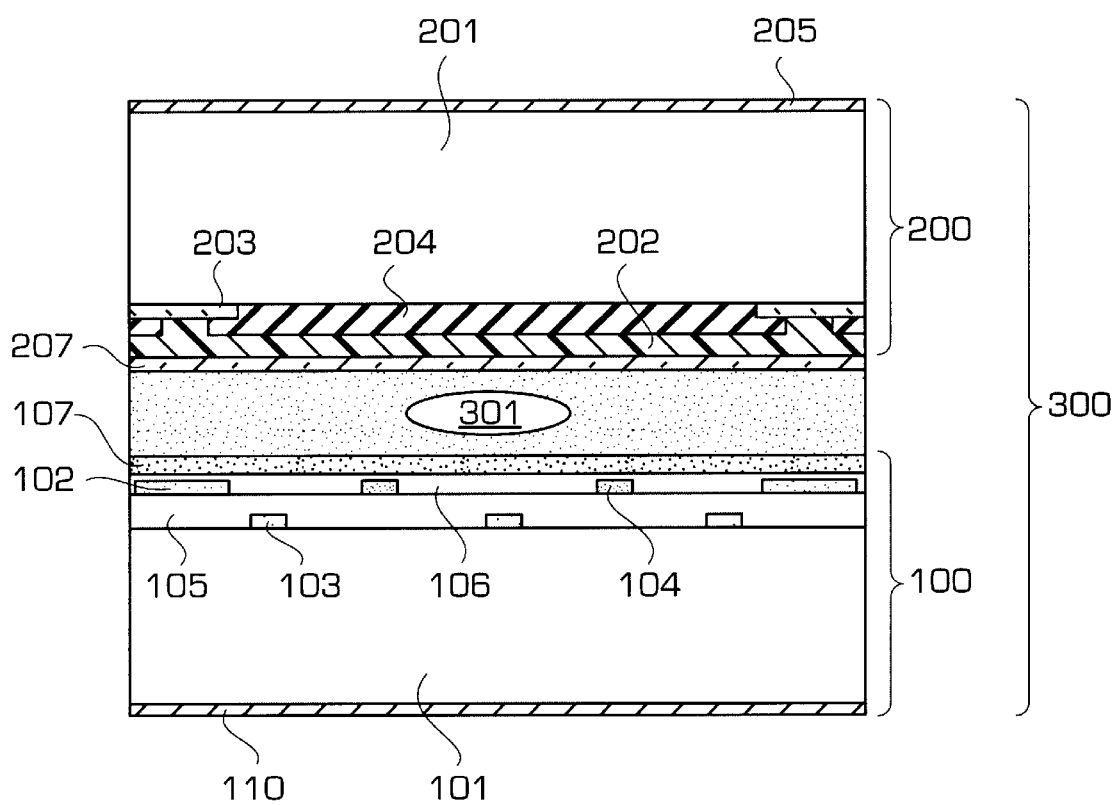
FIG. 2 is a cross-sectional view taken along line II—II of FIG. 1, showing a toothed region.
Figure 3:
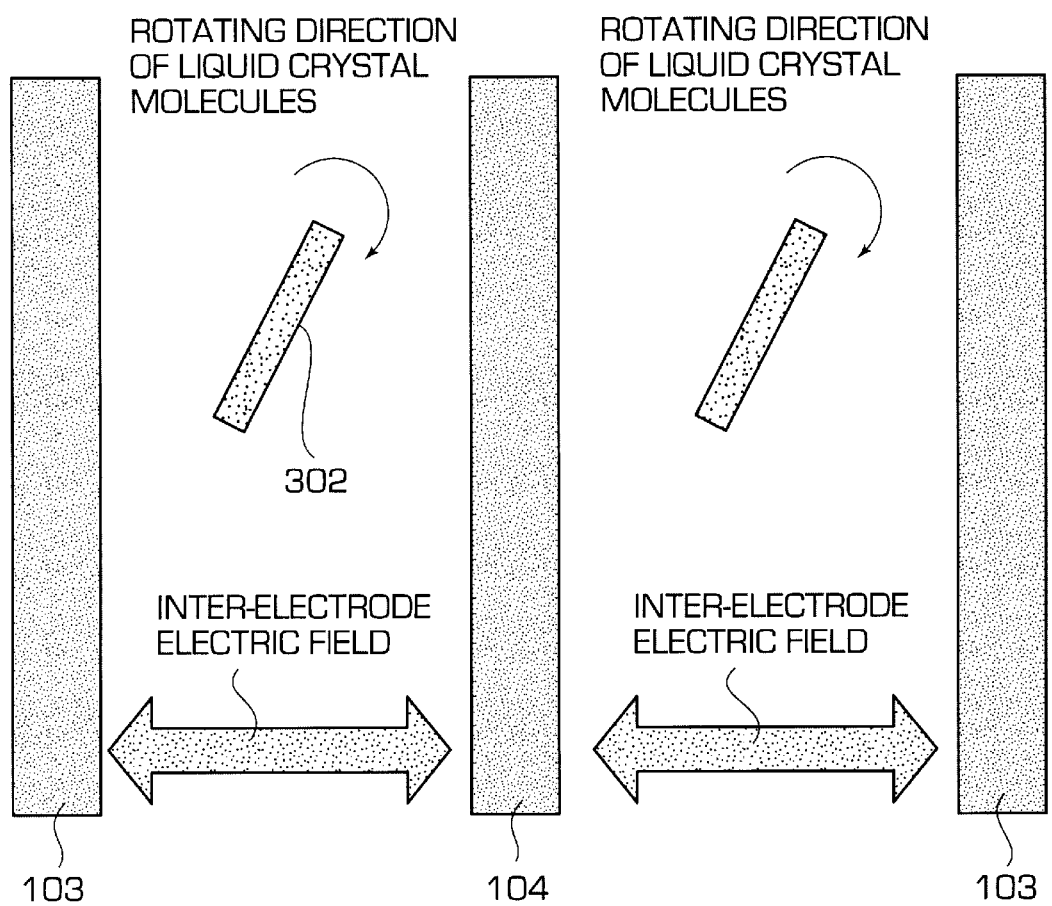
FIG. 3 is an enlarged view of a rectangular area of FIG. 1, the view being illustrative of the manner in which the conventional liquid crystal display device operates.
Figure 4:
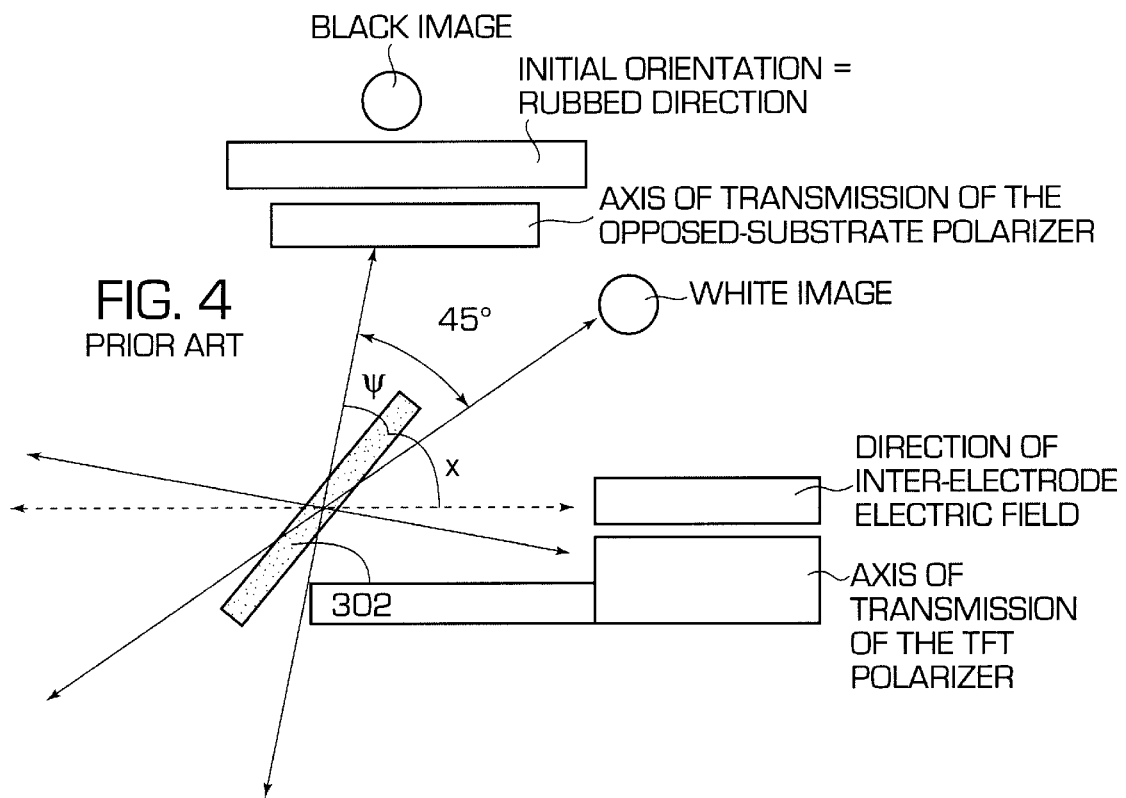
FIG. 4 is a diagram illustrative of the general mechanism for displaying an image according to the IPS process.
Figure 5:
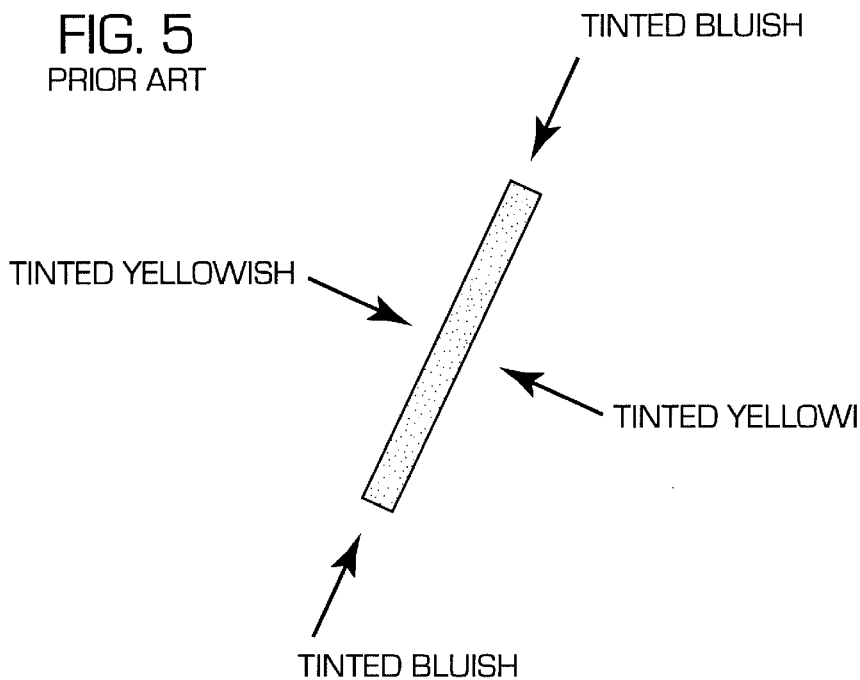
FIG. 5 is a diagram illustrative of the phenomenon of color tints.
Figure 6:
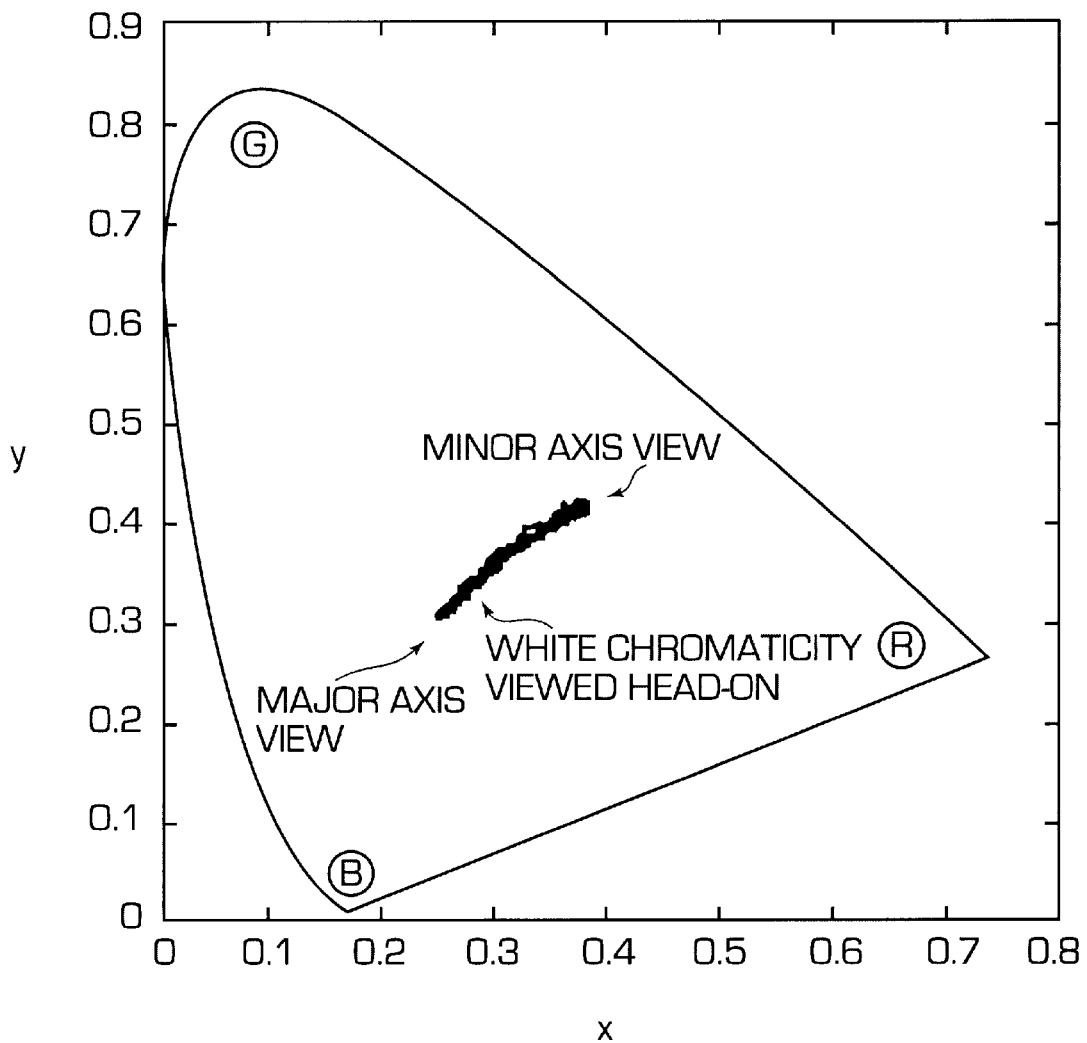
FIG. 6 is a diagram illustrative of the extent of color tints in the conventional liquid crystal display device.
Figure 7:
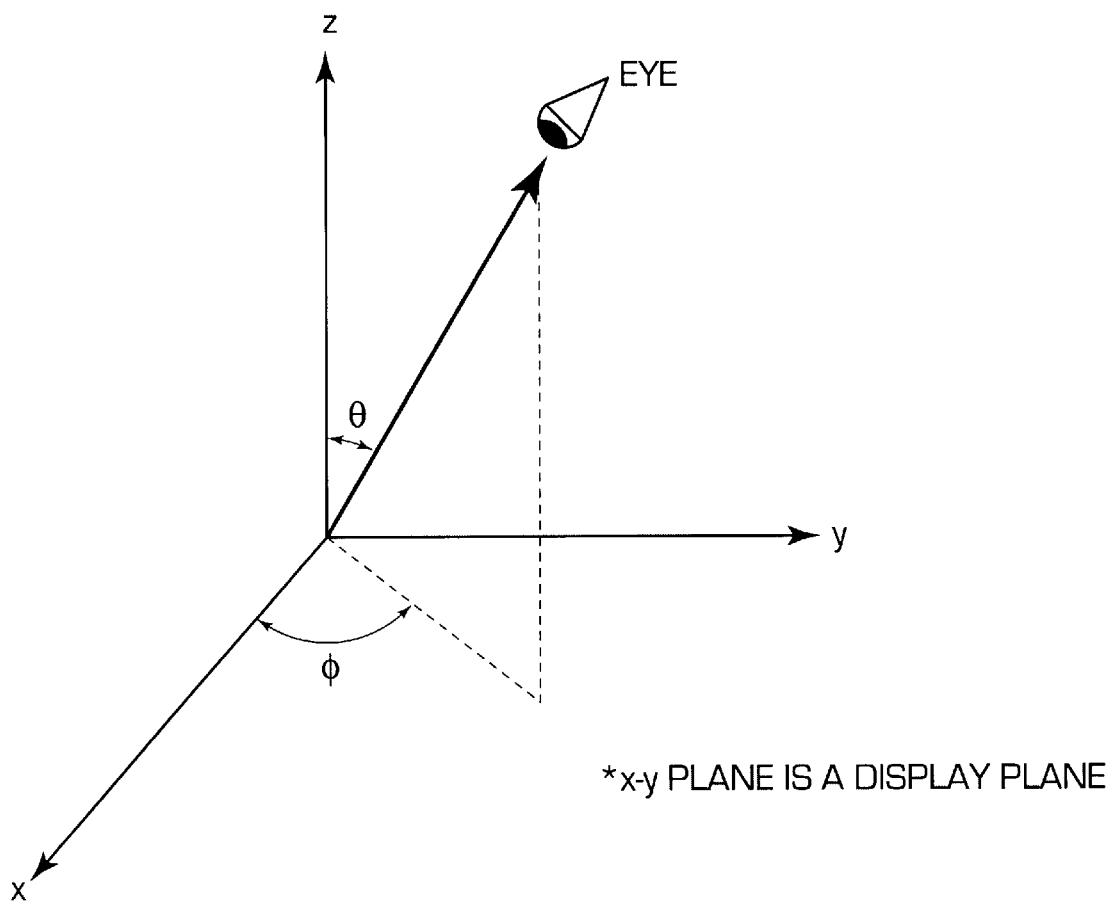
FIG. 7 is a diagram showing the definition of an azimuth angle and a viewing angle.
Figure 9:
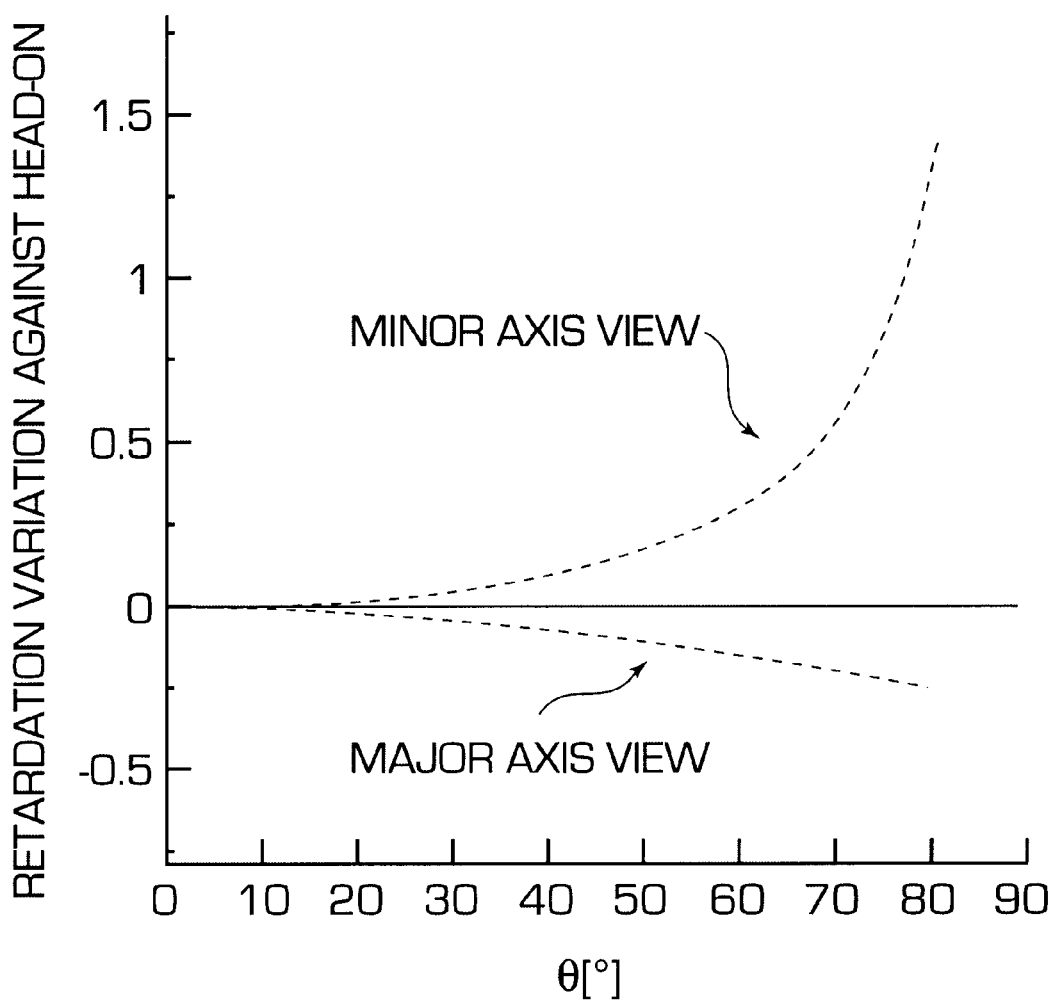
FIG. 9 is a diagram showing the dependency on the viewing angle of/an effective retardation.
Figure 10:
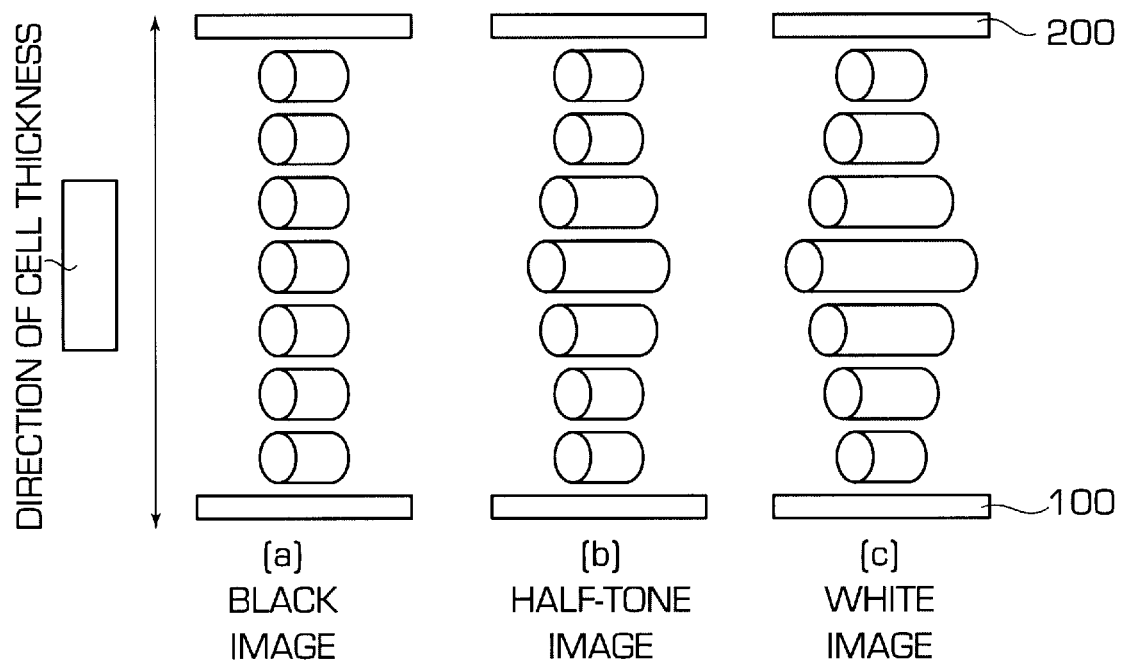
FIG. 10 is a diagram showing orientations of liquid crystal molecules when a black image, a middle-tone image, and a white image are displayed.
Figure 11:
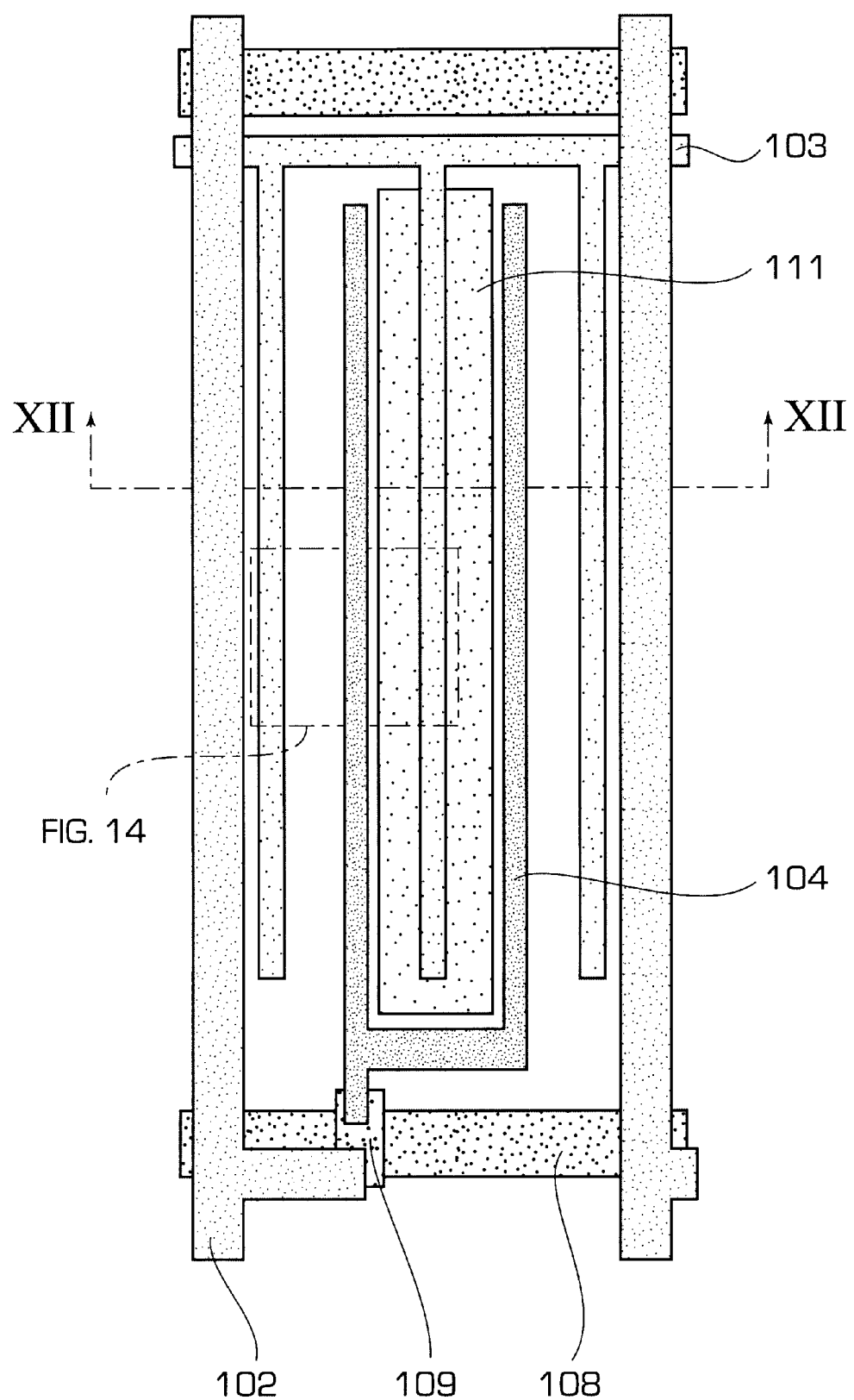
FIG. 11 is a plan view of an electrode structure of a unit pixel of a display pixel of a liquid crystal display device according to a first embodiment of the present invention.
Figure 12:
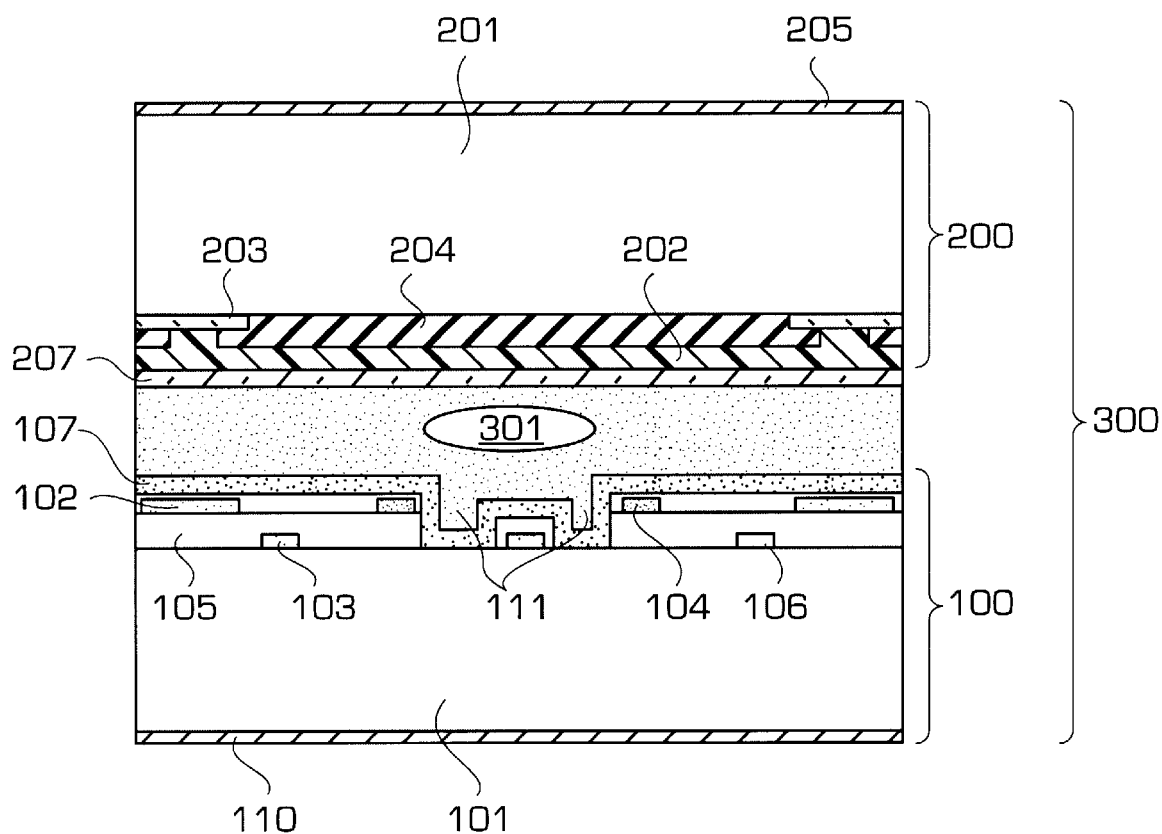
FIG. 12 is a cross-sectional view taken along line XII—XII of FIG. 11, showing a toothed region.

1st Embodiment:

An electrode structure of a unit pixel of a display pixel of a liquid crystal display device according to a first embodiment of the present invention will first be described below with reference to FIGS. 11 and 12. According to the first embodiment of the present invention, insulating film slits 111 are defined by removing an insulating film between electrode pairs, in any one or more of a plurality of pairs of electrodes including pixel electrodes 104 and common electrodes 103 within a unit pixel of a display pixel.

Figure 13:
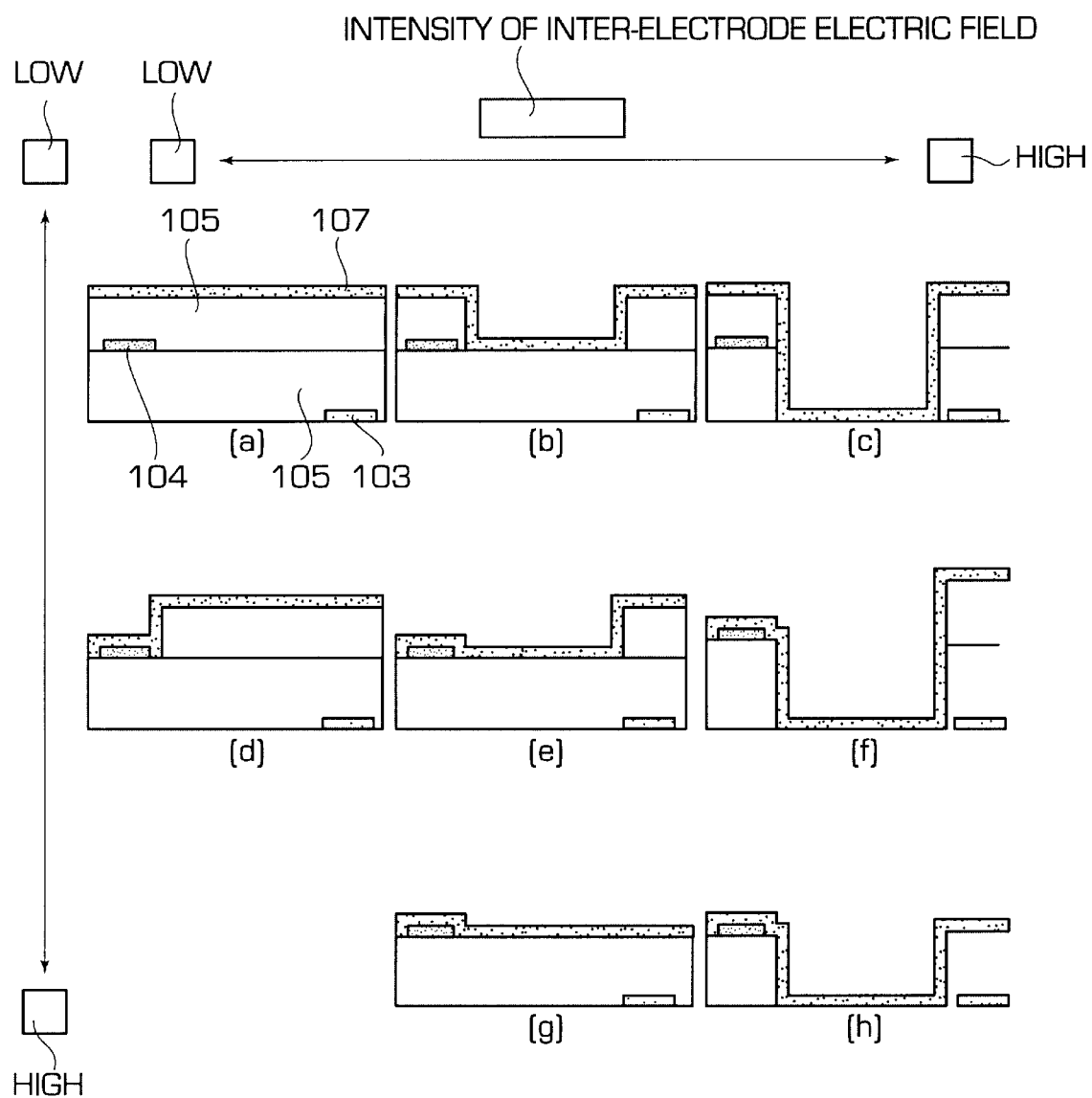
FIG. 13 is a cross-sectional view showing the position of slits in an inter-electrode insulating film in the liquid crystal display device according to the first embodiment of the present invention.

The insulating film slits 111 may be defined by removing an interlayer insulating film 105, or a protective insulating film 106, or both the interlayer insulating film 105 and the protective insulating film 106. The insulating film slits 111 may be located in two-dimensional positions on the pixel electrodes 104 or on the common electrodes 103 or between the electrodes. FIG. 13 shows eight typical examples of insulating film slits, including seven instances that can be possible in the actual process as shown at (b)–(h) in FIG. 13 and one instance that is free of slits as shown at (a) in FIG. 13.

Figure 14:
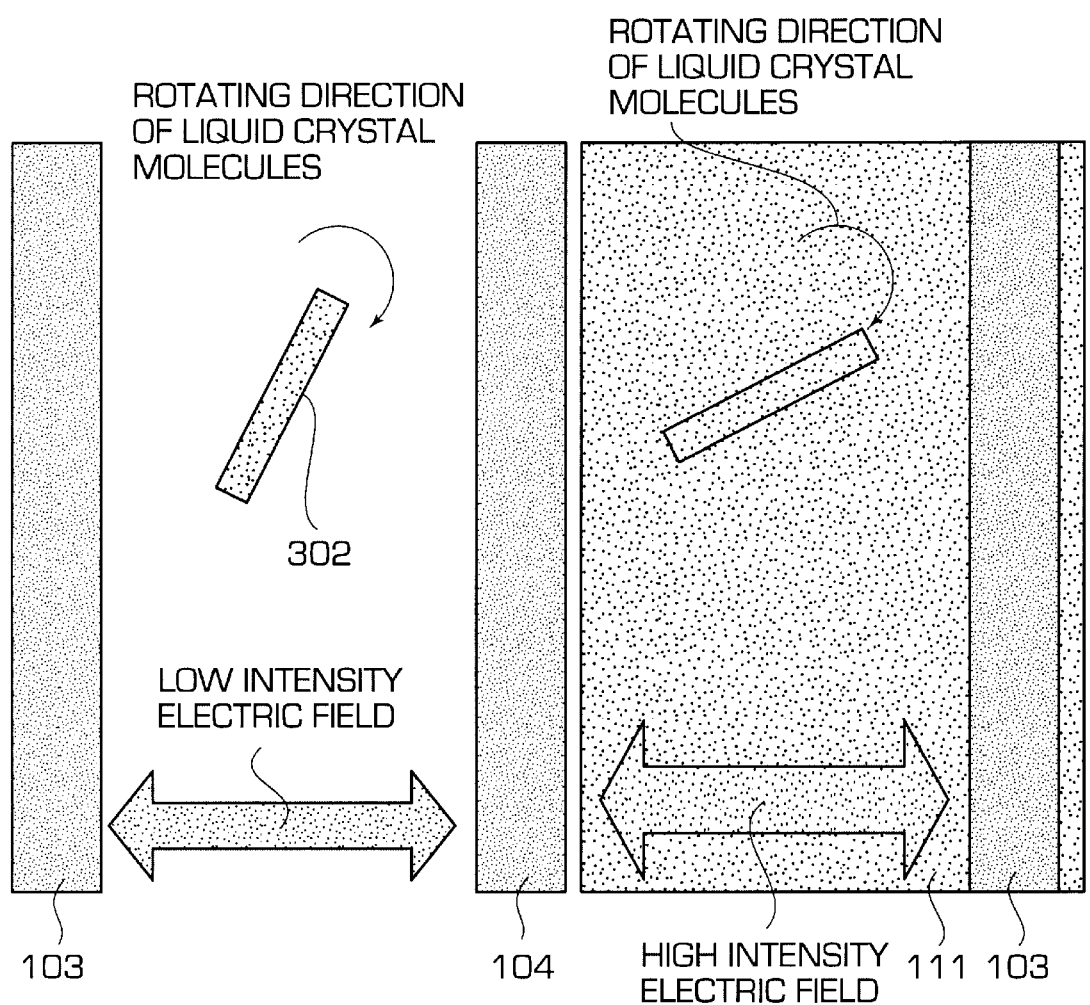
FIG. 14 is a is an enlarged view of a rectangular area of FIG. 11, the view being illustrative of the manner in which the conventional liquid crystal display device according to the first embodiment of the present invention operates.

Operation of the liquid crystal display device according to the first embodiment will be described below with reference to FIG. 14.

Figure 15:
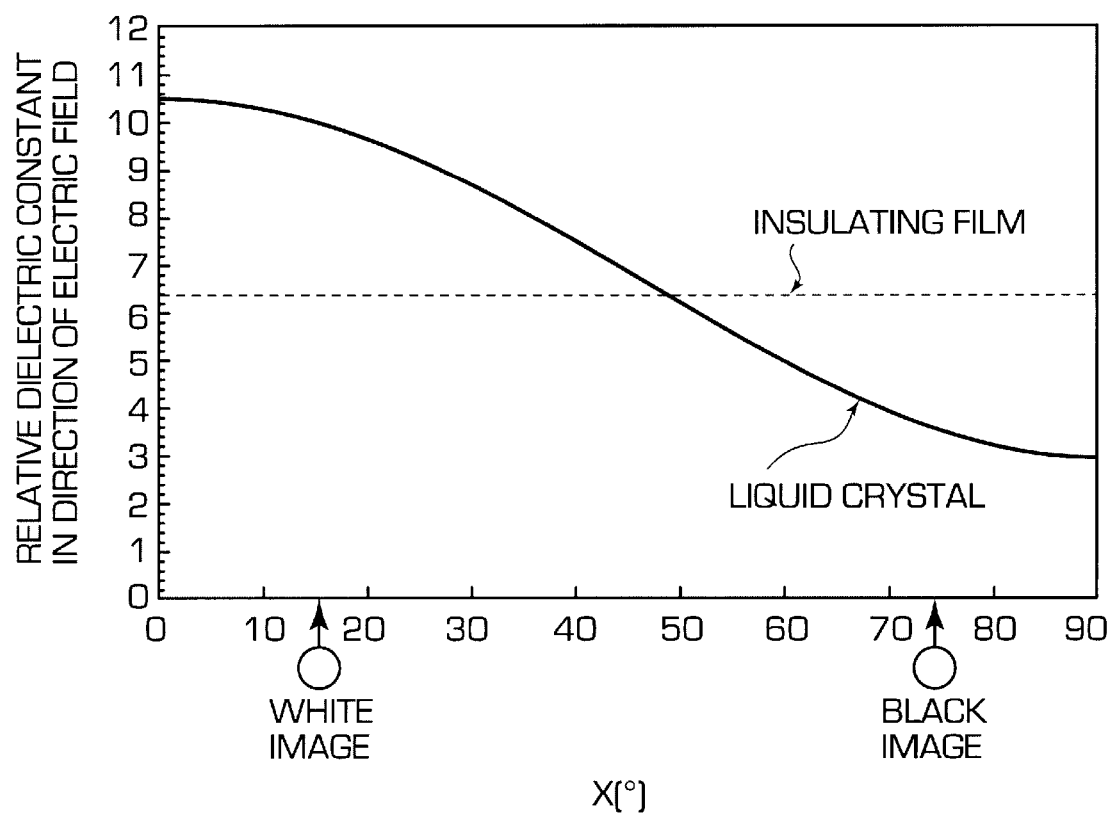
FIG. 15 is a diagram showing the relationship between an angle in which liquid crystal molecules are directed and an effective relative dielectric constant.
Figure 16:
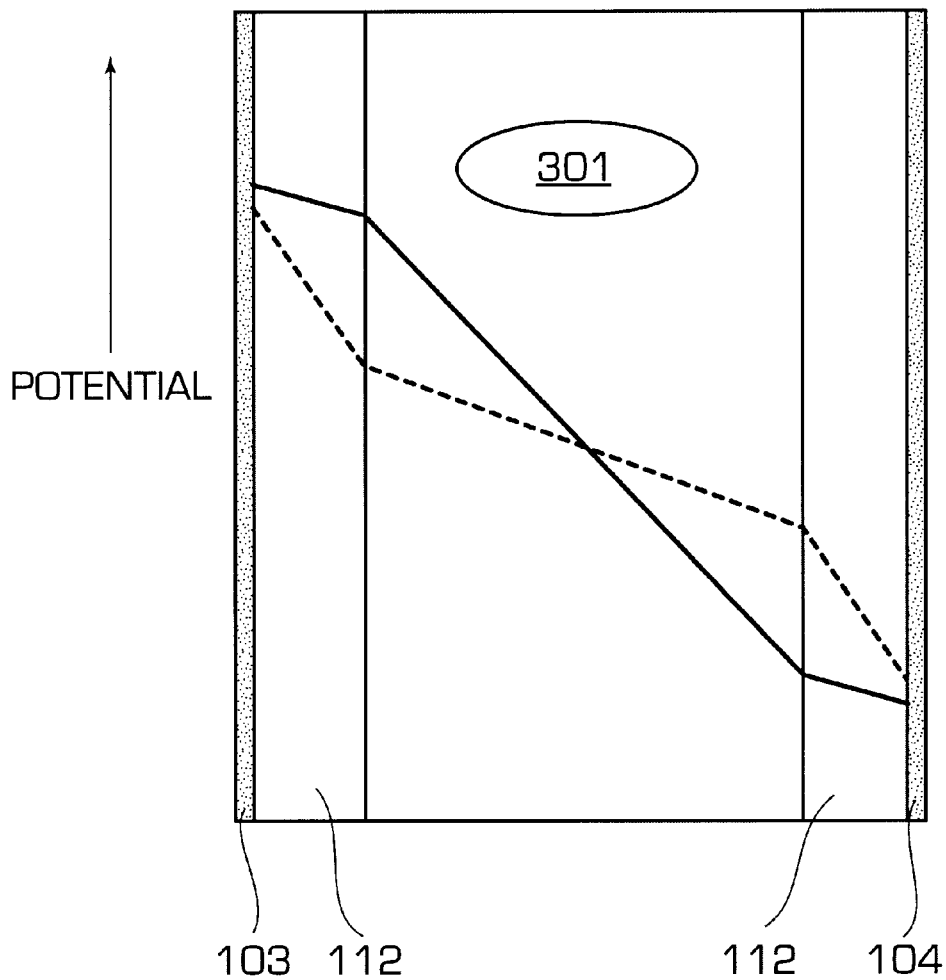
FIG. 16 is a diagram showing a potential gradation in a liquid crystal layer in the liquid crystal display device according to the first embodiment of the present invention.

According to the present invention, liquid crystal molecules 302 rotate through a greater angle in a region where a insulating film slit 111 is present because the intensity of the electric field is higher in that region than in a region free of any insulating film slit 111. The intensity of the electric field is increased for the following reason: Since the dielectric constant of the liquid crystal material is greater than the dielectric constant of the insulating film for displaying half-tone and white images (see the equation (3) below and FIG. 15), the voltage drop across the liquid crystal material is increased. FIG. 16 shows a potential gradient in a liquid crystal layer with the gap between the common and pixel electrodes 104, 103 being simplified as a parallel plane plate which comprises liquid crystal material 301 and inter-media 112 between electrodes and liquid crystal material. Another reason for the increased intensity of the electric field is that edges of the electrodes where the electric field concentrates face the liquid crystal material.

$$\epsilon = \epsilon_0 + (\epsilon_e - \epsilon_0) \cos^2 x \qquad (3)$$

where ε is the effective dielectric constant, $\epsilon_0$ the dielectric constant along the minor axis of the liquid crystal molecule, $\epsilon_e$ the dielectric constant along the major axis of the liquid crystal molecule, and x the angle formed between the electric field and the liquid crystal molecule.

Advantages of the liquid crystal display device according to the first embodiment will be described below.

Figure 17:
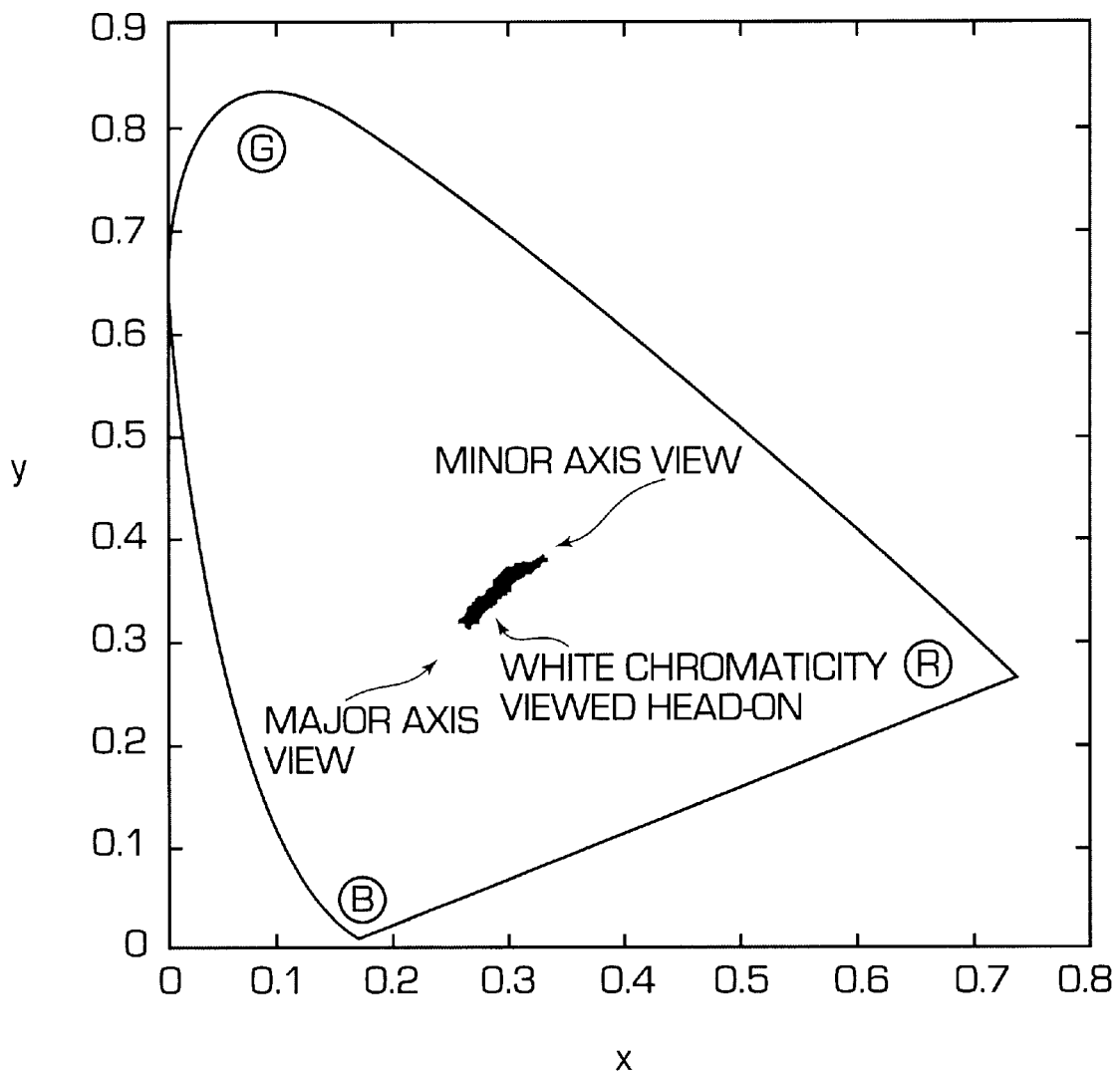
FIG. 17 is a diagram illustrative of a color tint reduction by the liquid crystal display device according to the first embodiment of the present invention.

According to the first embodiment, because gradations are displayed by a plurality of liquid crystal molecules 302 having different orientations, any color tint is smaller than with the conventional liquid crystal display device as the displayed image is viewed simultaneously along the major and minor axes of the liquid crystal molecules even in an angle of view where liquid crystal molecules 302 are not aligned and the viewing angle θ is large. FIG. 17 shows x-y chromaticity changes caused when a medium-tone image displayed on the liquid crystal display device is viewed at the viewing angle θ=60° and an azimuth angle φ=0°–360°. The chromaticity changes shown in FIG. 17 are about 50% of the chromaticity changes with the conventional liquid crystal display device. However, the aperture ratio remains unchanged because the electrodes are linear in shape as with the conventional liquid crystal display device. Furthermore, the observer does not visually recognize an after image since a region where the liquid crystal material suffers a reverse twist is present in the aperture of the display panel.

Figure 18:
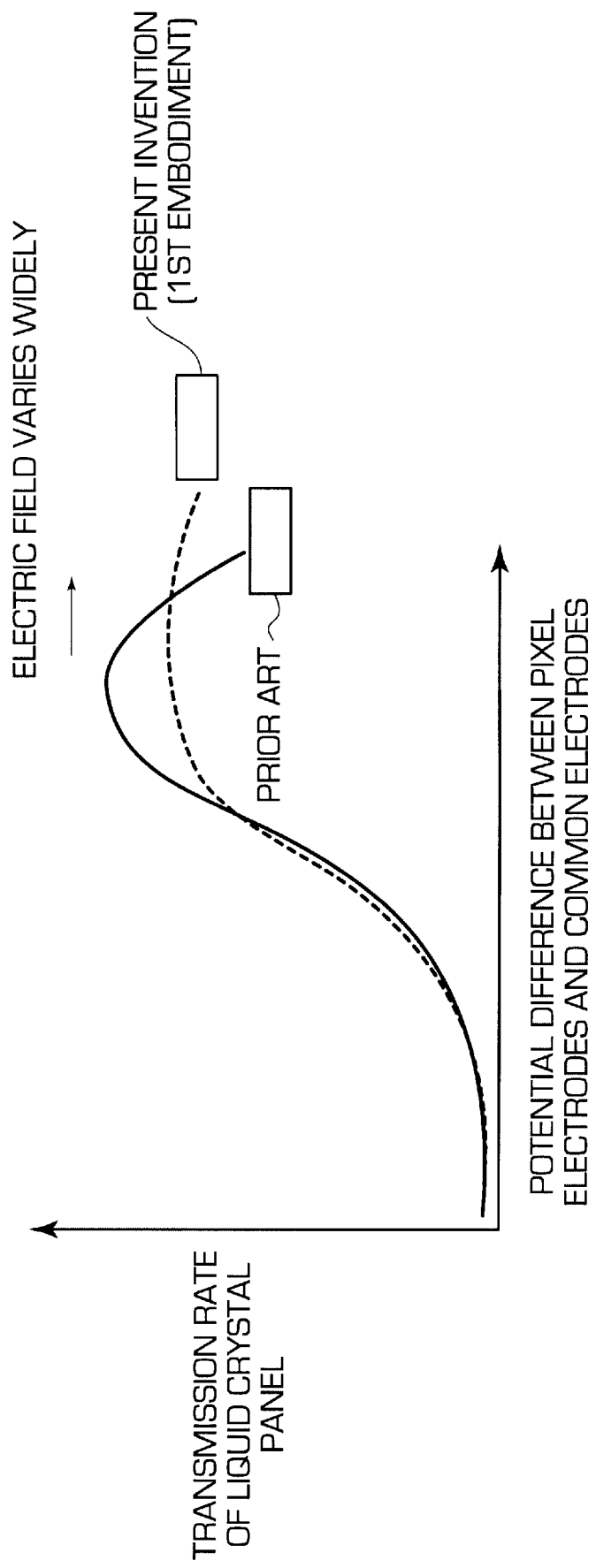
FIG. 18 is a diagram showing the voltage vs. luminance characteristic of the liquid crystal display device according to the first embodiment of the present invention.

There is a tradeoff between the reduction in the color tint and the reduction in the maximum luminance. As the difference between electric field intensities within one unit pixel increases, the liquid crystal molecules are directed through greater different angles, reducing the color tint. At this time, the maximum luminance decreases and the threshold voltage increases, as shown in FIG. 18. Therefore, it is necessary to combine the structures shown in FIG. 13 appropriately to best suit the use and purpose of the liquid crystal display device.

Figure 19:
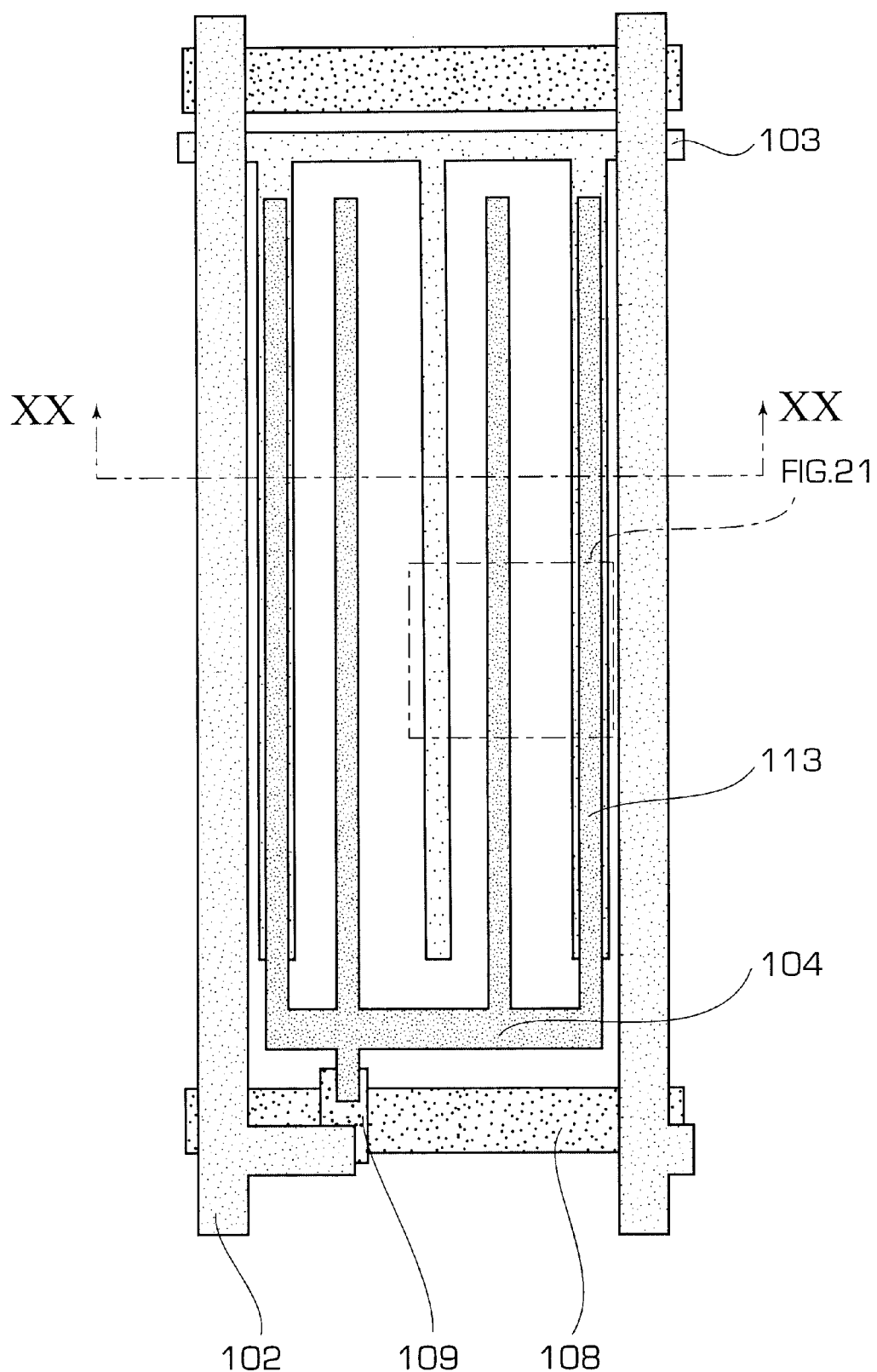
FIG. 19 is a plan view of an electrode structure of a unit pixel of a display pixel of a liquid crystal display device according to a second embodiment of the present invention.
Figure 20:
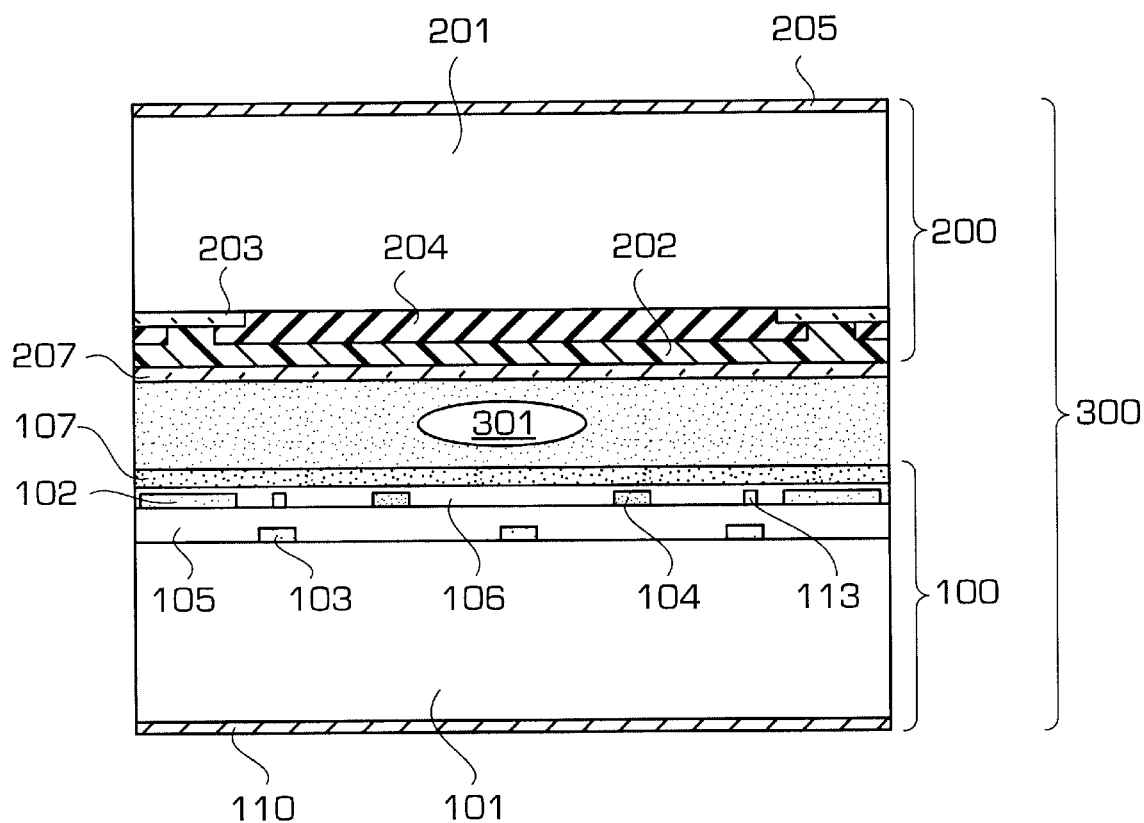
FIG. 20 is a cross-sectional view taken along line XX—XX of FIG. 19, showing a toothed region.

2nd Embodiment:

An electrode structure of a unit pixel of a display pixel of a liquid crystal display device according to a second embodiment of the present invention will first be described below with reference to FIGS. 19 and 20. According to the second embodiment of the present invention, electric field shield pixel electrodes 113 for shielding part of the electric field are patterned in the same layer as the pixel electrodes 104 above several common electrodes 103 of a plurality of pairs of electrodes including pixel electrodes 104 and common electrodes 103 within a unit pixel of a display pixel. Other structural details of the liquid crystal display device are identical to those of the conventional liquid crystal display device.

Figure 21:
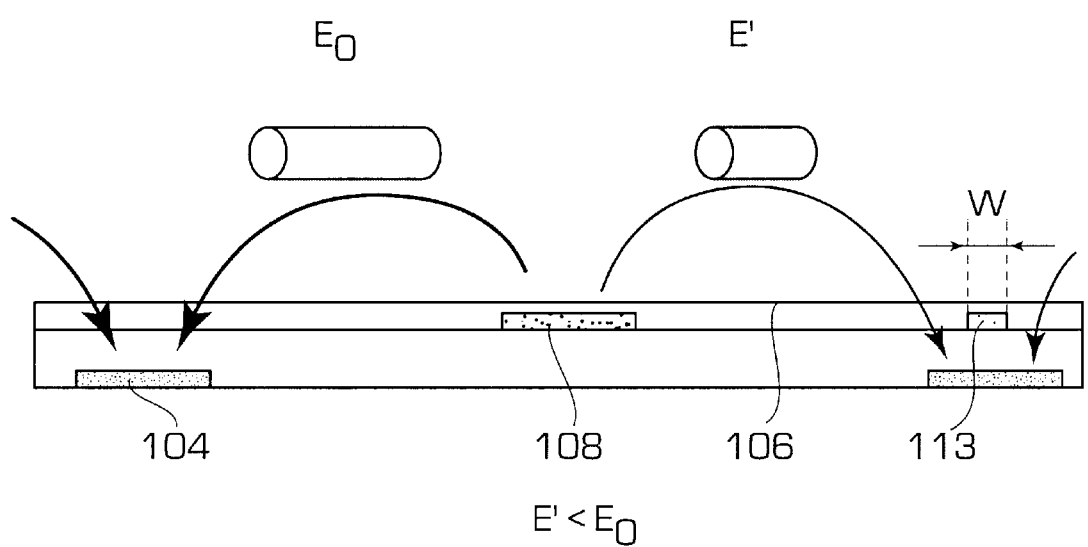
FIG. 21 is a cross-sectional view illustrative of the manner in which the liquid crystal display device according to the second embodiment of the present invention operates.

Operation of the liquid crystal display device according to the second embodiment of the present invention will be described below with reference to FIG. 21.

Figure 22:
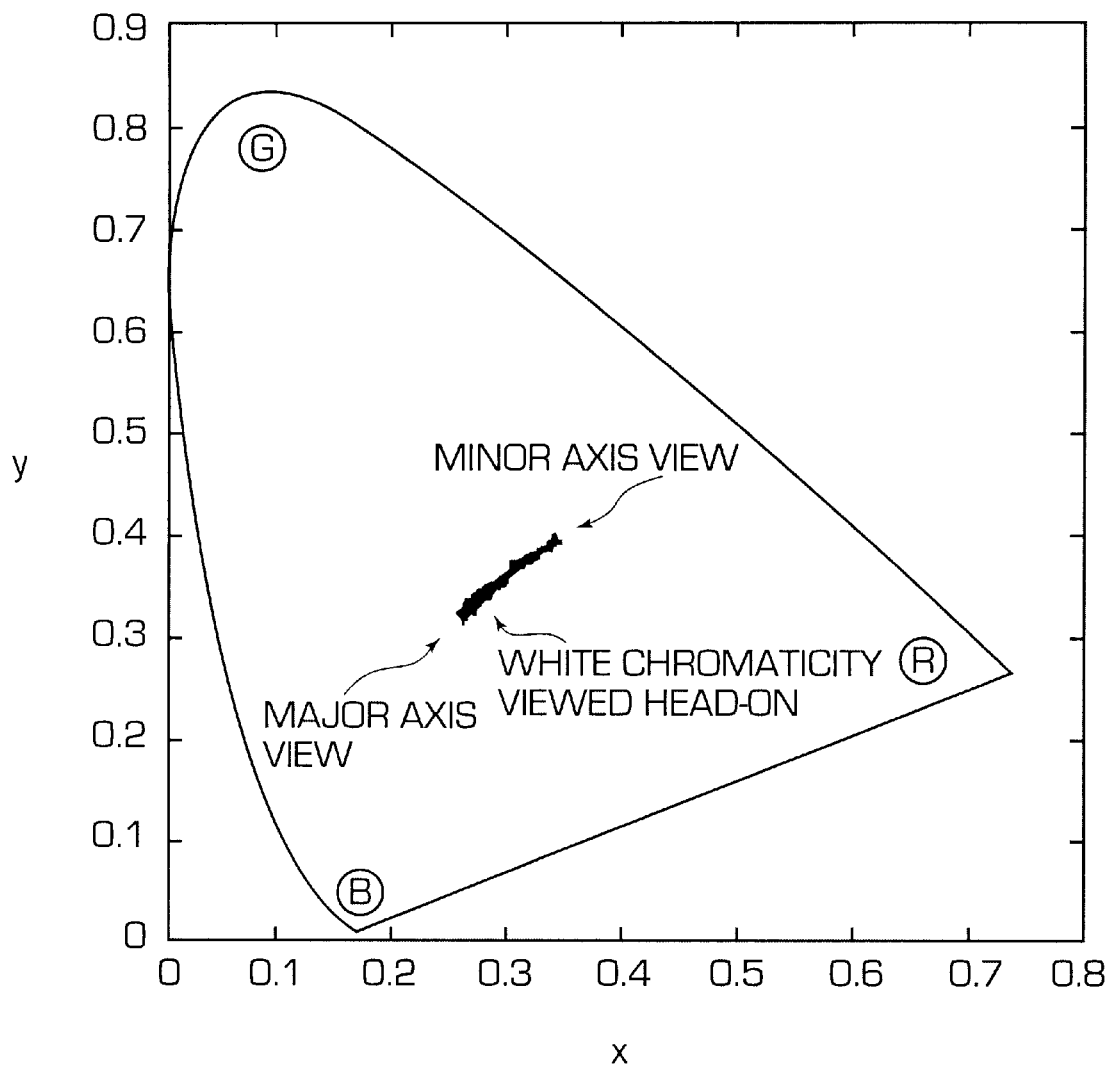
FIG. 22 is a diagram illustrative of a color tint reduction by the liquid crystal display device according to the second embodiment of the present invention.

In the second embodiment, because the electric field shield pixel electrodes 113 are disposed above the common electrodes 103, the intensity of an electric field generated from or absorbed by the common electrodes 103 is lowered. As the width of the field shield pixel electrodes 113 is greater, the intensity of the electric field becomes smaller. Consequently, since the intensity of the electric field is smaller in a light transmitting region adjacent to the field shield pixel electrodes 113 than in a region free of the field shield pixel electrodes 113, the liquid crystal molecules 302 are rotated through a smaller angle. The results are shown in FIG. 22.

In the second embodiment, there is also a tradeoff between the reduction in the color tint and the reduction in the maximum luminance. As the difference between electric field intensities within one unit pixel increases, the color tint is reduced. At this time, the maximum luminance decreases and the threshold voltage increases, as shown in FIG. 23. Therefore, it is necessary to determine the width w of the field shield pixel electrodes 113 appropriately to best suit the use and purpose of the liquid crystal display device.

According to the present invention, as described above, a field shield pixel electrode is disposed above at least one of common electrodes in a display pixel with an insulating layer interposed therebetween, for shielding part of an electric field generated by the common electrode, the field shield pixel electrode having a shape overlapping the common electrode, or a medium is disposed between common electrodes and pixel electrodes in a display pixel which are not identical but of at least two kinds, of pairs of pixel electrodes and common electrodes, for thereby varying the intensity of an applied electric field. It is possible to reduce a color tint at strict angles of view without producing an after image, while maintaining the aperture ratio of a liquid crystal display device according to the IPS process.

While preferred embodiments of the present invention have been described using specific terms, such description is for illustrative purposes only, and it is to be understood that changes and variations may be made without departing from the spirit or scope of the following claims.

What is claimed is:

1. An active-matrix liquid crystal display device comprising:

a plurality of display pixels, scanning lines, and signal lines disposed on a first transparent substrate;

a liquid crystal orientation film disposed on said first transparent substrate either directly or through an insulating layer;

a liquid crystal orientation film disposed on a second transparent substrate disposed in opposed relation to said first transparent substrate;

a liquid crystal layer sandwiched between said first transparent substrate and said second transparent substrate;

means for varying a polarized state of incident light applied to said first transparent substrate based on an oriented state of said liquid crystal layer;

said display pixel comprising pixel electrodes, common electrodes, and an active element for applying an electric field to said liquid crystal layer substantially parallel to said first transparent substrate and said second transparent substrate; and said display pixel being connected to external control means for controlling the applied electric field freely according to a display pattern;

wherein a distance between pairs of said pixel electrodes and said common electrodes, a width of said pixel electrodes, and a width of said common electrodes are constant; and said active-matrix liquid crystal display device further comprising means for varying an intensity of the applied electric field during application of the applied electric field to said display pixels, application of said electric field to said display pixels being controlled by said external control means according to said display pattern.

2. An active-matrix liquid crystal display device according to claim 1, wherein said means for varying the intensity of the applied electric field comprises a field shield pixel electrode disposed above at least one of said common electrodes in said display pixel with an insulating layer interposed therebetween, for shielding part of an electric field generated by said common electrode, said field shield pixel electrode having a shape overlapping part of said common electrode.

3. A method of displaying an image on an active-matrix liquid crystal display device according to claim 2, comprising the step of varying the intensity of the applied electric field with the means for varying the intensity of the applied electric field.

4. A method of displaying an image on an active-matrix liquid crystal display device according to claim 1, comprising the step of varying the intensity of the applied electric field with the means for varying the intensity of the applied electric field.

5. An active-matrix liquid crystal display device according to claim 1, wherein said means for varying the intensity of the applied electric field comprises a first medium, disposed between a first common electrode and a first pixel electrode, and a second medium, disposed between a second common electrode and a second pixel electrode, in the display pixel, and wherein said first medium is not identical to said second medium.

6. A method of displaying an image on an active-matrix liquid crystal display device according to claim 5, comprising the step of varying the intensity of the applied electric field with the means for varying the intensity of the applied electric field.

7. An active-matrix liquid crystal display device according to claim 1, wherein said means for varying the intensity of the applied field comprises a first medium, disposed between a first common electrode and a first pixel electrode, and a second medium, disposed between a second common electrode and said first pixel electrode, in the display pixel, and wherein said first medium is not identical to said second medium.

8. A method of displaying an image on an active-matrix liquid crystal display device according to claim 7, comprising the step of varying the intensity of the applied electric field by manipulating the electric field intensity regulator.

9. An active-matrix liquid crystal display device according to claim 1, wherein said means for varying the intensity of the applied field comprises a first medium, disposed between a first common electrode and a first pixel electrode, and a second medium, disposed between said first common electrode and a second pixel electrode, in the display pixel;

wherein said first medium is not identical to said second medium.

10. A method of displaying an image on an active-matrix liquid crystal display device according to claim 9, comprising the step of varying the intensity of the applied electric field by manipulating the electric field intensity regulator.

11. An active-matrix liquid crystal display device comprising:

a plurality of display pixels, scanning lines, and signal lines disposed on a first transparent substrate;

a liquid crystal orientation film disposed on said first transparent substrate either directly or through an insulating layer;

a liquid crystal orientation film disposed on a second transparent substrate disposed in opposed relation to said first transparent substrate;

a liquid crystal layer sandwiched between said first transparent substrate and said second transparent substrate;

wherein a polarized state of incident light applied to said first transparent substrate is varied based on an oriented state of said liquid crystal layer, said display pixel comprising pixel electrodes, common electrodes, and an active element for applying an electric field to said liquid crystal layer substantially parallel to said first transparent substrate and said second transparent substrate, said display pixel is connected to an external controller which controls the applied electric field freely according to a display pattern, and a distance between pairs of said pixel electrodes and said common electrodes, a width of said pixel electrodes, and a width of said common electrodes are constant;

said active-matrix liquid crystal display device further comprising an electric field intensity regulator which varies an intensity of the applied electric field during application of the applied electric field to said display pixels, application of said electric field to said display pixels being controlled by said external controller according to said display pattern.

12. An active-matrix liquid crystal display device according to claim 11, wherein said electric field intensity regulator comprises a field shield pixel electrode disposed above at least one of said common electrodes in said display pixel with an insulating layer interposed therebetween, for shielding part of an electric field generated by said common electrode, said field shield pixel electrode having a shape overlapping part of said common electrode.

13. A method of displaying an image on an active-matrix liquid crystal display device according to claim 12, comprising the step of varying the intensity of the applied electric field by manipulating the electric field intensity regulator.

14. A method of displaying an image on an active-matrix liquid crystal display device according to claim 11, comprising the step of varying the intensity of the applied electric field by manipulating the electric field intensity regulator.

15. An active-matrix liquid crystal display device according to claim 11, wherein said electric field intensity regulator comprises a first medium, disposed between a first common electrode and a first pixel electrode, and a second medium, disposed between a second common electrode and a second pixel electrode, in the display pixel, and wherein said first medium is not identical to said second medium.

16. A method of displaying an image on an active-matrix liquid crystal display device according to claim 15, comprising the step of varying the intensity of the applied electric field by manipulating the electric field intensity regulator.

17. An active-matrix liquid crystal display device according to claim 11, wherein said electric field intensity regulator comprises a first medium, disposed between a first common electrode and a first pixel electrode, and a second medium, disposed between a second common electrode and said first pixel electrode, in the display pixel, and wherein said first medium is not identical to said second medium.

18. A method of displaying an image on an active-matrix liquid crystal display device according to claim 17, comprising the step of varying the intensity of the applied electric field by manipulating the electric field intensity regulator.

19. An active-matrix liquid crystal display device according to claim 11, wherein said electric field intensity regulator comprises a first medium, disposed between a first common electrode and a first pixel electrode, and a second medium, disposed between said first common electrode and a second pixel electrode, in the display pixel, and wherein said first medium is not identical to said second medium.

20. A method of displaying an image on an active-matrix liquid crystal display device according to claim 19, comprising the step of varying the intensity of the applied electric field by manipulating the electric field intensity regulator.

* * * * *